United States Patent
Tsai et al.

(10) Patent No.: US 8,085,786 B2
(45) Date of Patent: Dec. 27, 2011

(54) H-ARQ THROUGHPUT OPTIMIZATION BY PRIORITIZED DECODING

(75) Inventors: Ming-Chang Tsai, San Diego, CA (US); James J. Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 12/018,928

(22) Filed: Jan. 24, 2008

(65) Prior Publication Data
US 2008/0225825 A1 Sep. 18, 2008

Related U.S. Application Data

(60) Provisional application No. 60/895,277, filed on Mar. 16, 2007.

(51) Int. Cl.
*H04L 12/56* (2006.01)
(52) U.S. Cl. .................................. 370/395.42
(58) Field of Classification Search .......... 370/203, 370/427, 471, 473, 395.42; 455/103, 91, 455/452.1, 562.1; 375/267, 260, 299, 346, 375/347, 337
See application file for complete search history.

(56) References Cited

U.S. PATENT DOCUMENTS

| | | | |
|---|---|---|---|
| 6,414,972 B1 * | 7/2002 | Hagai et al. | 370/532 |
| 7,096,401 B2 | 8/2006 | Cudak et al. | |
| 7,272,113 B2 | 9/2007 | Cheng et al. | |
| 7,292,825 B2 | 11/2007 | Beale et al. | |
| 7,298,701 B2 | 11/2007 | Hsu et al. | |
| 7,426,201 B2 | 9/2008 | Kim et al. | |
| 2010/0077275 A1 * | 3/2010 | Yu et al. | 714/752 |

FOREIGN PATENT DOCUMENTS

EP 1567968 7/2005

OTHER PUBLICATIONS

Li, Xuehua, et al. An ordered HARQ scheme for LDPC-coded OFDM system, IEEE, Beijing Information Technology Institute, Beijing University of Posts & Telecommunications.
International Search Report—PCT/US08/057278—International Search Authority, European Patent Office—Oct. 1, 2008.
Written Opinion—PCT/US08/057278—International Search Authority, European Patent Office—Oct. 1, 2008.

* cited by examiner

*Primary Examiner* — Brenda H Pham
(74) *Attorney, Agent, or Firm* — Donald C. Kordich; Mary A. Fales (57) ABSTRACT

Systems and methodologies are described that facilitate data throughput optimization in a receiver through prioritized decoding of data transmissions. In particular, mechanisms are provided that assign priorities to obtained packets and/or sub-packets of a data transmission. The priorities can be assigned based at least upon prioritization rules that identify packets and/or sub-packets most likely to successfully decode. The obtained packets and/or sub-packets are decoded based upon the assigned priorities.

31 Claims, 10 Drawing Sheets

H-ARQ THROUGHPUT OPTIMIZATION BY PRIORITIZED DECODING

CROSS-REFERENCE TO RELATED APPLICATIONS

This application claims the benefit of U.S. Provisional Patent application Ser. No. 60/895,277 entitled "H-ARQ THROUGHPUT OPTIMIZATION BY PRIORITIZED DECODING" which was filed Mar. 16, 2007. The entirety of the aforementioned application is herein incorporated by reference.

BACKGROUND

I. Field

The following description relates generally to communications systems and more particularly to prioritizing packets and/or sub-packets before decoding.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, single-input multiple output (SIMO), multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \min(N_T, N_R)$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for decoding data is described herein. The method can comprise receiving a data transmission that includes one or more sub-packets. In addition, the method can include assigning a priority to each of the one or more sub-packets. The method can also comprise decoding the one or more sub-packets based at least in part on the assigned priority.

Another aspect relates to a wireless communications apparatus that can comprise a memory that retains instructions related to receiving a data transmission that includes one or more sub-packets, assigning a priority to each of the one or more sub-packets and decoding the one or more sub-packets based at least in part on the assigned priority. The wireless communications apparatus can also include an integrated circuit coupled to the memory, configured to execute the instructions retained in the memory.

Yet another aspect relates to a wireless communications apparatus that facilitates optimizing data throughput. The apparatus can include means for receiving a data transmission that includes one or more sub-packets. In addition, the apparatus can include means for assigning a priority to each of the one or more sub-packets. The apparatus can further comprise means for decoding the one or more sub-packets based at least in part on the assigned priority.

Still another aspect relates to a computer-readable medium having stored thereon executable code. The computer-readable medium can comprise code for causing a computer to receive a data transmission that includes one or more sub-packets. In addition, the computer-readable medium can include code for causing a computer to assign a priority to each of the one or more sub-packets. Moreover, the computer-readable medium can also comprise code for causing a computer to decode the one or more sub-packets based at least in part on the assigned priority.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
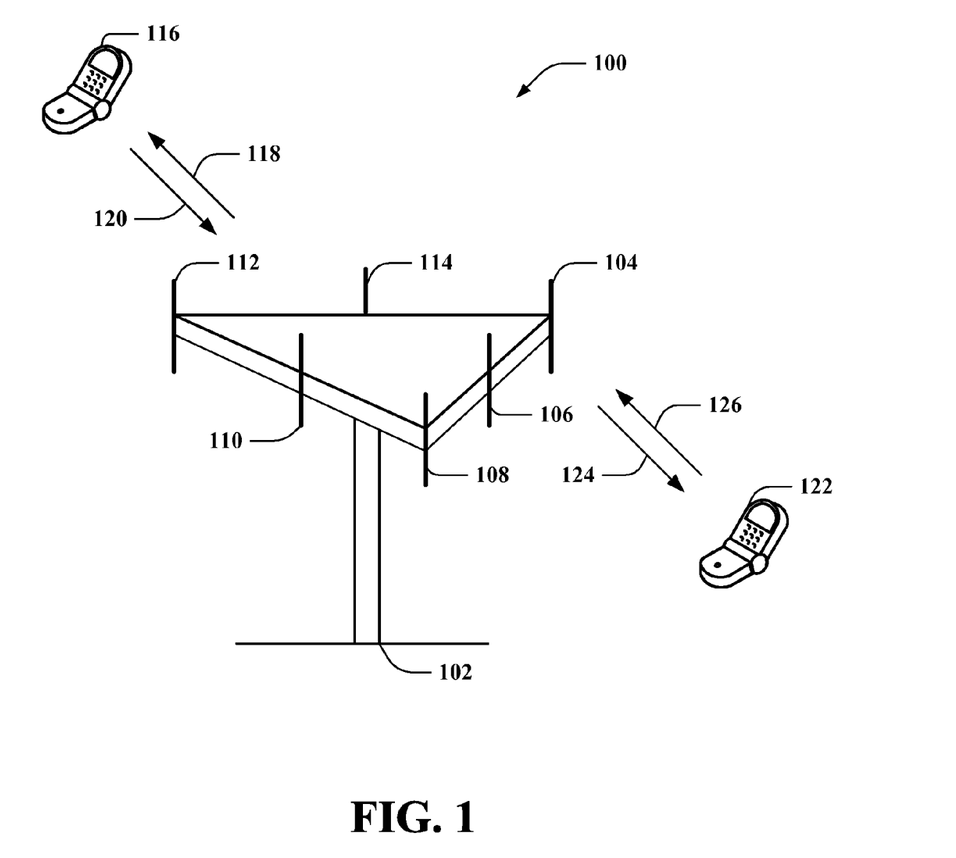
FIG. 1 is an illustration of a wireless communication system in accordance with various aspects set forth herein.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing such as FDD, TDD, etc. Pursuant to an illustration, base station 102 may transmit over forward links 118 and 124 to mobile devices 116 and 122. Moreover, mobile devices 116 and 122 may estimate respective forward link or downlink channels and generate corresponding feedback that may be provided to base station 102 via reverse links or uplinks 120 and 126. In addition, base station 102 may transmit data to mobile device 116 and 122 over forward links 118 and 124 respectively in a plurality of data packets. It is to be appreciated that mobile devices 116 and 122 can transmit data to base station 102 via reverse links 120 and 126 respectively in a plurality of data packets.

In packet transmission scheme, the transmitter (e.g., base station 102 and/or mobile devices 116 and 122) can segment a data transmission into a series of data packets transmitted as a unit. A data packet can be sub-divided into data sub-packets. The number of segmentations or packets in a data stream and/or the number of data sub-packets in a packet can be based upon various parameters. For example, the number of sub-packets a transmitter can send per frame and/or the number of sub-packets a receiver can decode per frame can be employed to establish a frame size (i.e., number of sub-packets per packet). Moreover, the receiver can only declare a successful decoding after decoding an entire packet (e.g., all sub-packets in a packet). High throughput and high resource efficiency can be bounded by hybrid automatic repeat request (H-ARQ) target thresholds and receiver resources or capabilities. For example, a receiver can be capable of decoding 5 sub-packets per frame even though 10 sub-packets are transmitted per frame. In this situation, full resource utilization may only be achieved with perfect channel conditions such that every packet is successfully decoded on first attempt. Pursuant to this example, 10 sub-packets will be decoded in 2 frames under perfect channel conditions. Thus, a transmission comprised of 10 sub-packets wherein it requires 3 repeat transmissions or frames before a particular sub-packet is decoded results in under utilization of resources. In other words, the other 9 sub-packets decode successfully in the first two transmissions so the last transmission only utilizes a fraction of the decoding resources of the receiver.

Accordingly, a receiver (e.g., base station 102 and/or mobile devices 116 and 122) can decode sub-packets based upon an assigned priority as opposed to order in which the sub-packets are received. The priority can be assigned to the sub-packets based on various parameters and sub-packet characteristics. In the most basic form, priority is assigned to maximize throughput. For example, sub-packets are prioritized to increase the likelihood of successful decode on first attempt. Sub-packets are prioritized and ordered such that the highest priority sub-packets is provided to the decoder for prompt decoding while saving the lower priority sub-packets for later decoding.

Figure 2:
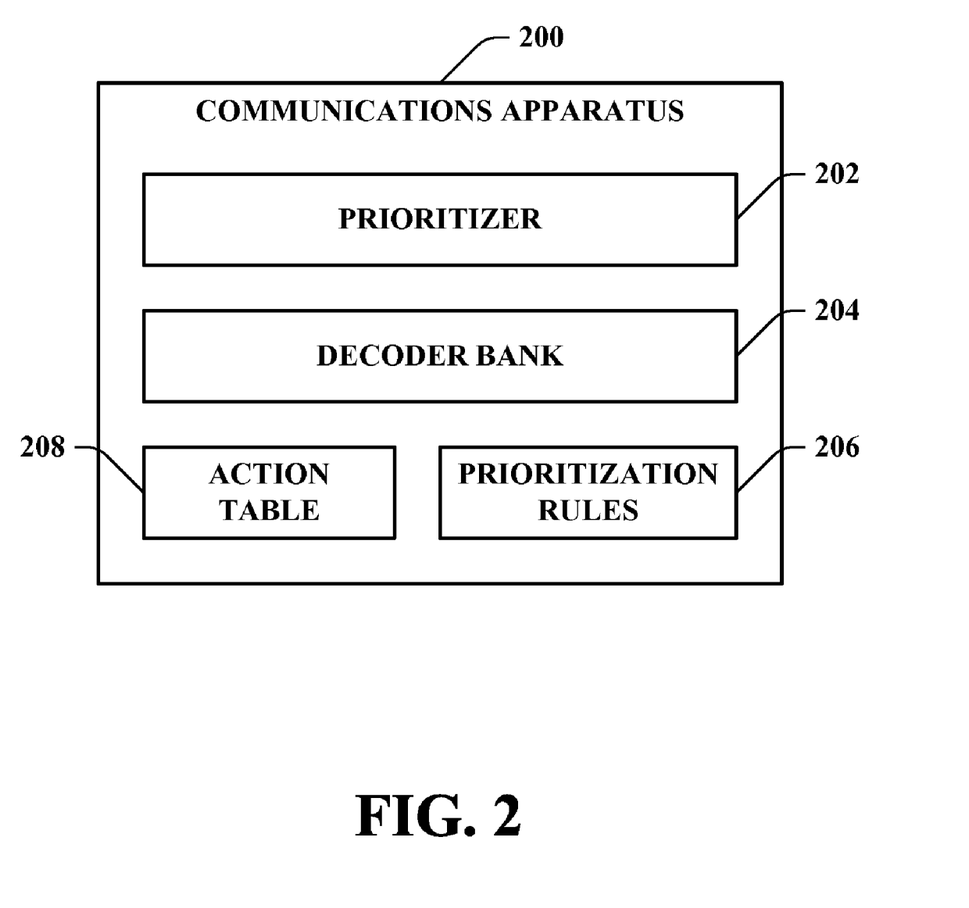
FIG. 2 is an illustration of an example communications apparatus for employment in a wireless communications system according to an aspect of the subject disclosure.

Turning now to FIG. 2, illustrated is a communications apparatus 200 for employment in a wireless communications environment that facilitates prioritized decoding of sub-packets. Communications apparatus 200 can be a base station or a portion thereof. In addition, communications apparatus 200 can be a mobile device or a portion thereof. Communications apparatus 200 can receive data transmissions sent by a transmitter (not shown). A data transmission can include a plurality of packets and/or sub-packets. In an embodiment, communications apparatus 200 processes data transmissions at the sub-packet level. For example, each sub-packet is processed individually. Communications apparatus 200 can process multiple sub-packets in parallel depending on receiver design, redundancy of resources, etc. Under ideal conditions (e.g., perfect channel conditions and the like), communications apparatus 200 can handle all sub-packets received without requiring repeated transmissions to account for failed processing. Non-ideal conditions typically lead to resource underutilization and, accordingly, reduced throughput.

Communications apparatus 200 includes a prioritizer 202 that assigns a priority to each sub-packet received in a frame by communications apparatus 200. Prioritizer 202 provides prioritized sub-packets to decoder bank 204 for decoding based upon the assigned priorities. Typically, decoder bank 204 decodes sub-packets in the order received. In an aspect of the subject disclosure, the priorities assigned by prioritizer 202 indicate a ranking of likelihoods of successful decoding. In other words, sub-packets assigned a high priority have a higher probability of being successfully decoded than sub-packets assigned a low priority. If every sub-packet is decoded only one time (i.e., a time at which the sub-packet can be decoded successfully), then an absolute minimum receiver resource requirement can be achieved. In addition, maximum throughput can also be achieved. However, a receiver may not possess sufficient knowledge to realize these conditions. Prioritizer 202 can employ various prioritization schemes to ensure decoders are utilized in situations where the highest return is expected. These prioritization schemes can maximize receiver resource (e.g. decoders) while communications apparatus 200 retains imperfect information regarding channel conditions, transmission errors, and the like.

In an embodiment, the prioritization schemes can be retained by communications apparatus as a collection of prioritization rules 206. Prioritization schemes can be selected from prioritization rules 206 based at least upon assignment information, decoding results, transmission status, etc. The prioritization schemes or rules 206 can include, but not limited to, assigning higher priorities to sub-packets with transmission numbers closer to a H-ARQ threshold target, assigning higher priorities to sub-packets with higher transmission numbers, assigning higher priorities to sub-packets with more receiver resources engaged, assigning higher priorities to sub-packets included in packets with the fewest number of pending sub-packets, and/or assigning higher priorities to sub-packets with more favorable decoder metrics. In addition, priorities can be assigned based upon quality of service (QoS) considerations. For example, priorities can be assigned among users and/or streams based upon contributions to QoS. Moreover, priorities assigned utilizing one or more of the previously specified schemes can be modified based upon QoS to preserve guarantees. It is to be appreciated that prioritizer 202 can select and employ one or more schemes from prioritization rules 206. In addition, prioritizer 202 can assign priorities to sub-packets based upon aggregated results of one or more schemes. For example, prioritizer 202 can assign priorities to sub-packets based upon a plurality of schemes from prioritization rules 206. The individual priorities from each scheme among the plurality of schemes can be summed together to generate final priority assignments. In addition, an average priority, a median priority, a mode of the priorities, a weighted average, a weighted sum, a heuristic combination, or the like can be employed to generate a final priority assigned to a sub-packet.

Prioritizer 202 orders obtained sub-packets in a frame based upon priority and stores the prioritized sub-packets in an action table 208 to be utilized by decoder bank 204. The action table 208 ranks sub-packets from highest priority to lowest priority. In an embodiment, the action table 208 operates as a decoding queue for decoder bank 204 such that the decoder bank 204 retrieves and decodes the top most n sub-packets from the action table 208 where n is the size (i.e., number of decoders) of the decoder bank. Through prioritization, the decoder bank 204 can be efficiently sized. High throughput can be achieved without increasing receiver cost, transport latency or undesirable changes to receiver architecture. As receiver data throughput is not necessarily a linear function of available decoder resources, it is not a requirement to attempt decoding every packet and/or sub-packet every frame. Sub-packet prioritization can lead to higher throughput and higher resource utilization under average channel conditions.

Moreover, although not shown, it is to be appreciated that communications apparatus 200 may include memory that retains instructions with respect to receiving data transmissions, selecting prioritization rules, assigning priorities to sub-packets, decoding data-packets, and the like. Further the memory can retain previously prioritization rules, decoding data, sub-packet tables, action tables, etc. Further, communications apparatus 200 may include a processor that may be utilized in connection with executing instructions (e.g., instructions retained within memory, instructions obtained from a disparate source, . . . ).

Figure 3:
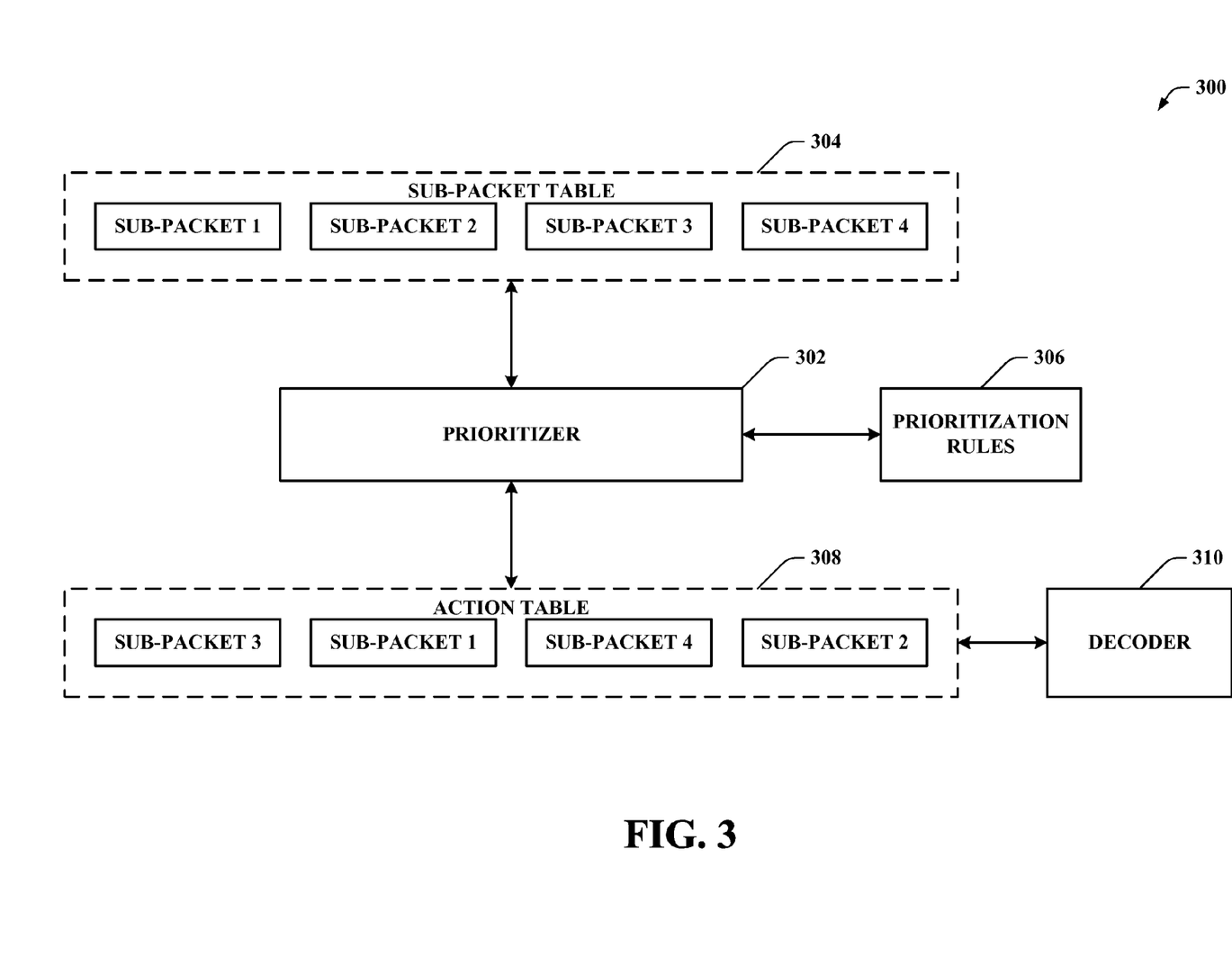
FIG. 3 is an illustration of an example system that facilitates optimizing data throughput in a wireless communications system according to an aspect of the subject disclosure.

Referring to FIG. 3, illustrated is an example system 300 that facilitates optimizing H-ARQ throughput through prioritization of sub-packets for decoding. System 300 includes a prioritizer 302 that assigns a priority to data packets and/or sub-packets in a frame to optimize receiver throughput and efficiency. Typically, sub-packets are decoded in the order received but prioritizer 302 rearranges the decoding order to maximize throughput and resource utilization. System 300 includes a sub-packet table 304 that retains received sub-packets. The sub-packet table 304 can store received sub-packets in any order. For example, in an embodiment, sub-packets can be retained in the order in which the packets are received. However, it is to be appreciated that other organizational techniques can be employed. In the illustrative instance depicted in FIG. 3, sub-packet table 304 retains sub-packets 1 through 4. For the purposes of explanation, sub-packet 1 is received prior to sub-packet 2, sub-packet 2 is received prior to sub-packet 3 and so on.

In conventional receivers, the sub-packets are decoded in the order received. Prioritizer 302 assigns a priority to sub-packets 1 through 4 based upon one or more schemes specified by prioritization rules 306. Prioritizer 302 can make the determination of priority based on any one scheme or a combination of schemes. The possible prioritization schemes include, but are not limited to giving high priority to sub-packets with transmission number closer to target or higher transmission number; sub-packets that have taken longer to process and thus have more resources tied up; packets with fewer sub-packets pending; and sub-packets with better decoder metrics. It is also possible to include additional rules giving different priority among users or streams for contribution to QoS, if desirable.

Sub-packet priorities are retained by an action table 308 that is utilized by a decoder 310 to decode sub-packets 1 through 4 based at least in part on the assigned priorities. Pursuant to this illustration, prioritizer 302 assigns priorities to sub-packets 1 through 4 such that sub-packet 3 has the highest priority, sub-packet 1 has the second highest priority, sub-packet 4 has the next highest and sub-packet 2 has the lowest priority. Accordingly, sub-packet 3 is decoded before sub-packets 1 and 2 even though sub-packet 3 is received subsequently. In an embodiment, priorities indicate a likelihood of decoding success. Decoding in a prioritized order reduces duplicative decoding efforts and poor utilization of resources due to failed decode attempts. It is to be appreciated that the orders and numbers in FIG. 3 are provided for illustrative purposes only and not limitation.

Figure 4:
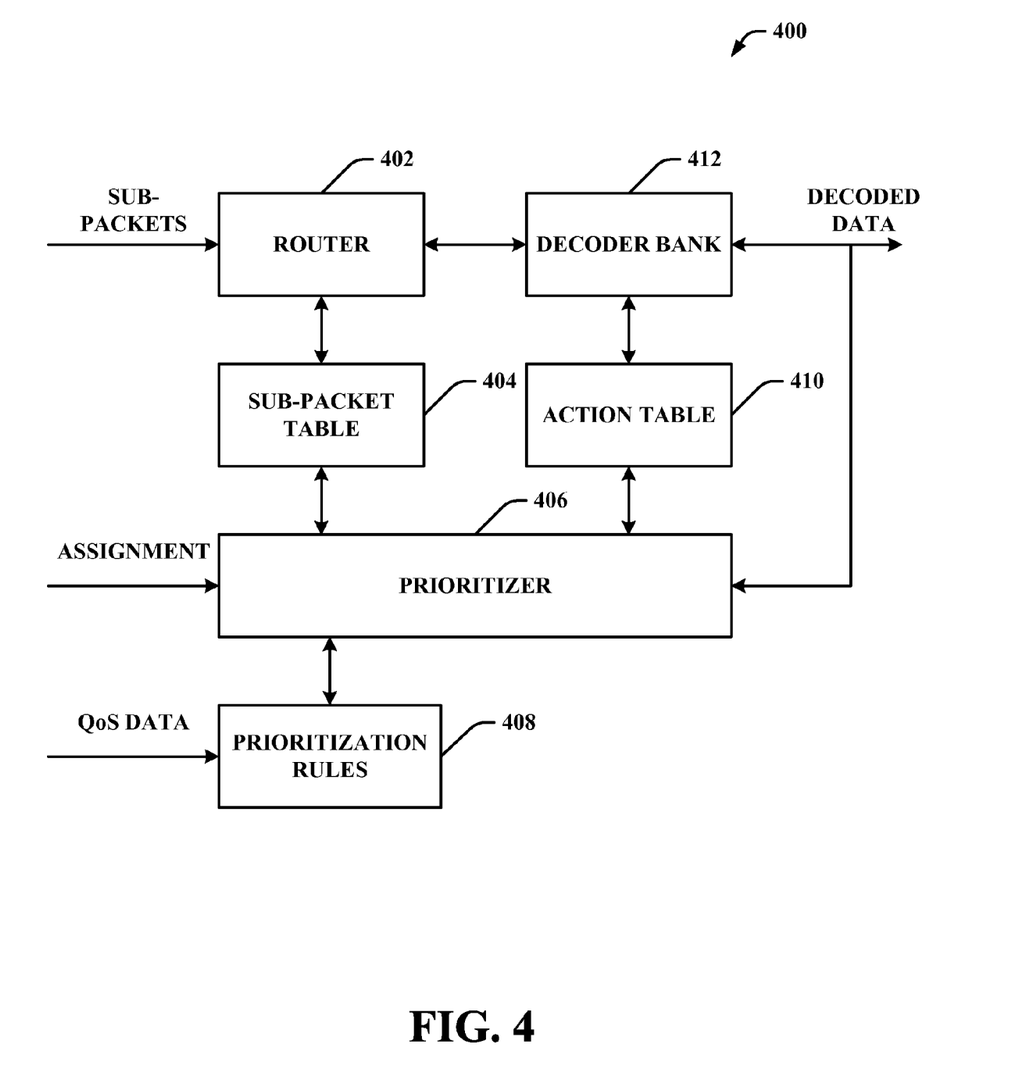
FIG. 4 is an illustration of an example receiver employable in a wireless communications system according to an aspect of the subject disclosure.

FIG. 4 illustrates an example receiver system 400 employable in a wireless communications system. System 400 can obtain data transmissions that include one or more packets and/or sub-packets. System 400 includes a router 402 that collects the obtained sub-packets. Router 402 can log the obtained sub-packets in a sub-packet table 404. In addition, router 402 can retain the sub-packets until decoding. For example, router 402 can router the sub-packets to a buffer or other memory device (not shown) for storage until decoded. Further, it is to be appreciated that sub-packet table 404 can operate as a buffer or memory and retain the sub-packets. Moreover, in some situations prioritization may not be necessary and router 402 can provide sub-packets to a decoder bank 412. For example, in a first received transmission the number of sub-packets can be equivalent to the number of decoders included in the decoder bank 412. In this circumstance, prioritization can be skipped.

System 400 further includes a prioritizer 406 that that assigns a priority to each sub-packet received in a frame. Prioritizer 406 collects sub-packets and related information (e.g., transmission numbers associated with sub-packets) and assigns priorities thereto based upon prioritization schemes included in prioritization rules 408. The prioritization rules 408 can include, but not limited to, assigning higher priorities to sub-packets with transmission numbers closer to a H-ARQ threshold target, assigning higher priorities to sub-packets with higher transmission numbers, assigning higher priorities to sub-packets with more receiver resources engaged, assigning higher priorities to sub-packets included in packets with the fewest number of pending sub-packets, and/or assigning higher priorities to sub-packets with more favorable decoder metrics. In addition, priorities can be assigned based upon QoS considerations. For example, priorities can be assigned among users and/or streams based upon contributions to QoS. Moreover, priorities assigned utilizing one or more of the previously specified schemes can be modified based upon QoS to preserve guarantees. Further, prioritizer 406 can utilize assignment information when designating priorities to sub-packets. If receiver system 400 is employed by a mobile device, assignment information can include details of a current assignment of the mobile device. Moreover, if receiver system 400 is employed by a base station, assignment information can include information regarding the current assignment of mobile devices transmitting sub-packets, as well as future assignments.

Prioritizer 406 generates an action table 410 that specifies sub-packets and associated priorities. In addition, in an aspect of the subject disclosure, the action table can provide an ordering of sub-packets based upon priority (e.g., from highest to lowest priority). Prioritizer 406 can generate the action table 410 based at least in part on the sub-packet table, assignment information, prioritization rules 408, QoS information, and/or decoding result information. Decoder bank 412 can include one or more decoders that decode sub-packets. In an embodiment, decoder bank 412 can retrieve sub-packets from the action table 410 based at least upon assigned priorities. However, it is to be appreciated that decoder bank 412 can employ action table 410 as a lookup and subsequently request relevant sub-packets from router 402 and/or sub-packet table 404. Decoder bank 412 provides decoding results to prioritizer 406 to consider in assigning priorities. Decoding results can include sub-packets that successfully decoded and/or sub-packets that failed to decode.

Figure 5:
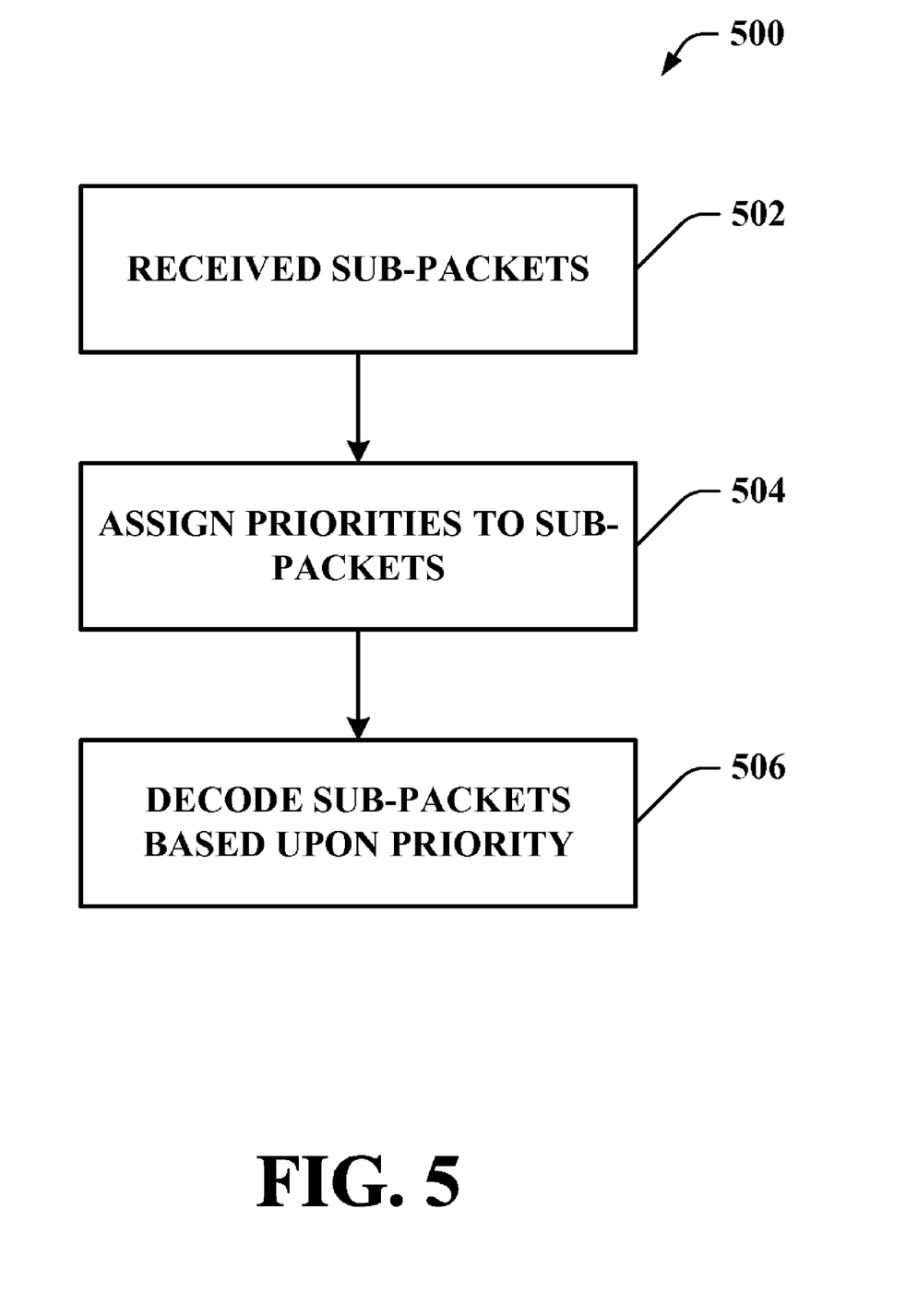
FIG. 5 is an illustration of an example methodology that facilitates decoding data transmissions based upon priority in accordance with an aspect of the subject disclosure.
Figure 6:
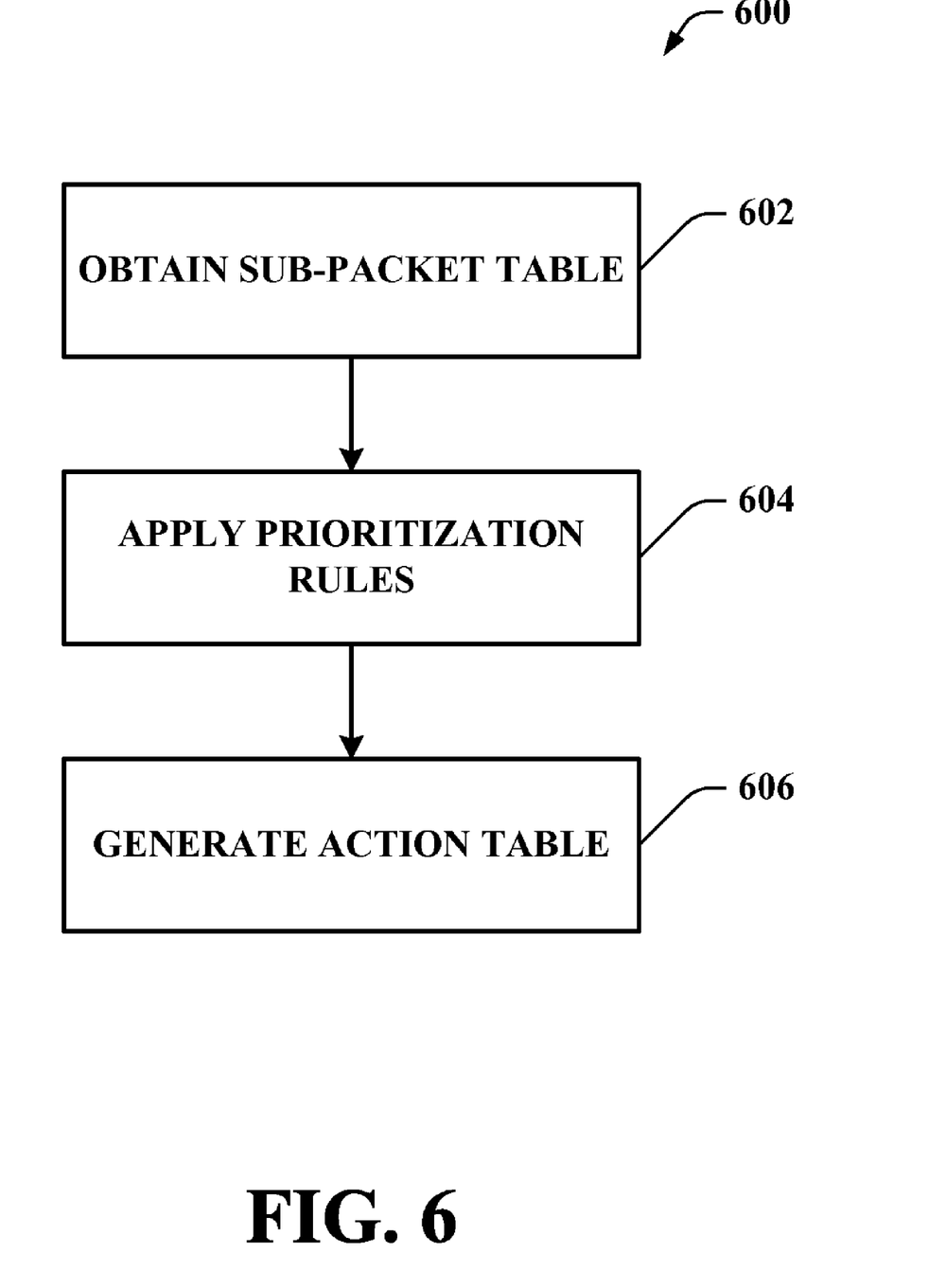
FIG. 6 is an illustration of an example methodology that facilitates assigning priorities in accordance with an aspect of the subject disclosure.

Referring to FIGS. 5 and 6, illustrated are methodologies relating to facilitating enhanced receiver throughput and resource utilization through prioritized decoding. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning now to FIG. 5, illustrated is a methodology 500 that facilitates decoding data transmissions based upon priority. Method 500 can be employed, among other things, to increase data throughput and resource utilization in a receiver. In an embodiment, method 500 can be implemented on a mobile device and/or a base station in a wireless communications system. At reference numeral 502, a transmission of sub-packets is received. The transmission can be a frame of data that includes one or more sub-packets. A sub-packet is a unit of data that is individually processed by a receiver. In one aspect, the sub-packets can be logged and/or retained in a sub-packet table. At reference numeral 504, priorities are assigned to each sub-packet collected in the transmission frame. The priorities can indicate a probability of successful decoding such that higher priority sub-packets have a higher probability of successfully decoding than lower priority sub-packets. At reference numeral 506, the obtained sub-packets are decoded based at least in part on priority. Higher priority packets can be decoded before lower priority packets to achieve an optimized rate of return. For example, by prioritizing packets before decoding, more sub-packets can be decoded successfully on first attempt. Data throughput and resource utilization is optimized by preventing employment of decoding resources that achieve failed results while packets that can be decoded successfully are halted.

FIG. 6 illustrates a methodology 600 that facilitates assigning priorities to received sub-packets. Method 600 can be employed by a receiver, among other things, optimize decoding of received sub-packets through prioritization of the sub-packets. In an embodiment, method 600 can be implemented on a mobile device and/or a base station in a wireless communications system. At reference numeral 602, a sub-packet table is obtained. The sub-packet table can include all received sub-packets and associated information such as transmission numbers, H-ARQ threshold targets, frame and/or packet correspondence, and the like. At 604, prioritization rules are applied to sub-packets retained by the sub-packet table. The possible prioritization rules include, but are not limited to giving high priority to sub-packets with transmission number closer to target or higher transmission number; sub-packets that have taken longer to process and thus have more resources tied up; packets with fewer sub-packets pending; and sub-packets with better decoder metrics. It is also possible to include additional rules giving different priority among users or streams for contribution to QoS, if desirable. It is to be appreciated that many prioritization rules or scheme that promote decoding sub-packets with a highest likelihood of success can be applied in the connection with the subject disclosure. At reference numeral 606, an action table is generated that specifies a preferred prioritized order in which sub-packets are to be decoded.

It will be appreciated that, in accordance with one or more aspects described herein, inferences can be made regarding selecting prioritization rules, assigning priorities, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to prioritizing sub-packets. By way of further illustration, an inference may be made related to determining whether a particular prioritization rule should be selected, assigning priorities based upon rules, assignment information, QoS information and/or decoding results, generating a prioritization scheme through employment of artificial intelligence techniques, etc. It will be appreciated that the foregoing examples are illustrative in nature and are not intended to limit the number of inferences that can be made or the manner in which such inferences are made in conjunction with the various embodiments and/or methods described herein.

Figure 7:
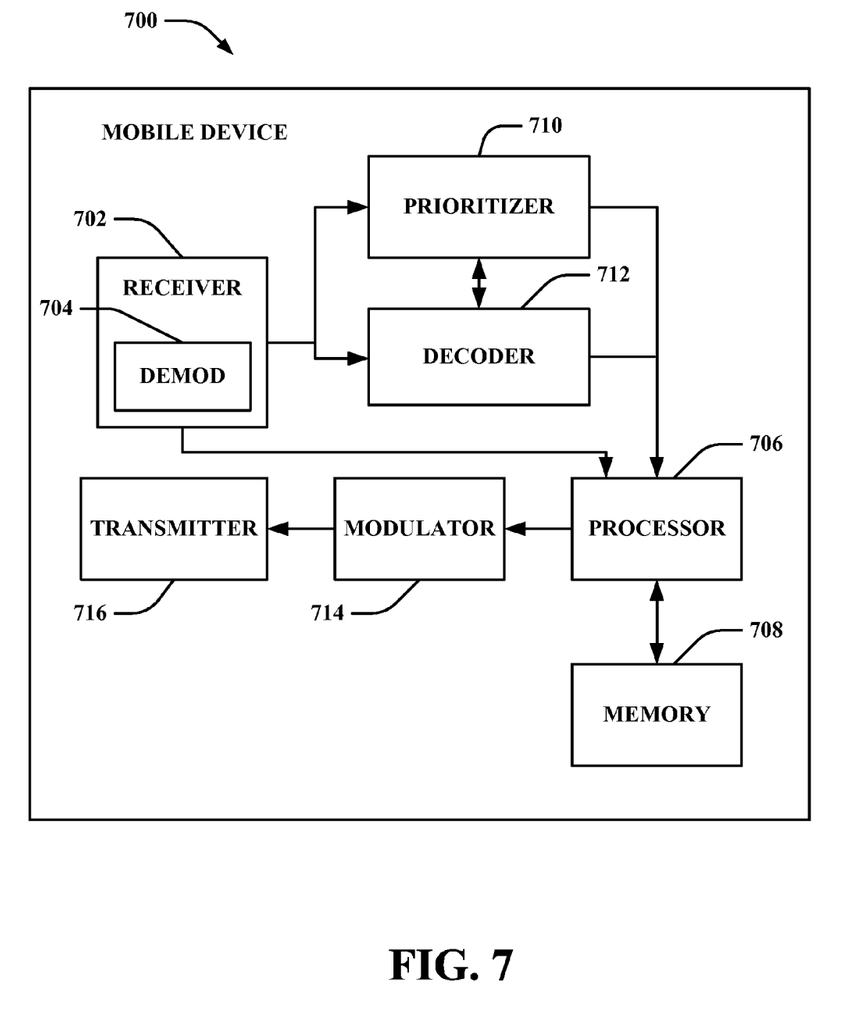
FIG. 7 is an illustration of an example mobile device that facilitates prioritized decoding.

FIG. 7 is an illustration of a mobile device 700 that facilitates decoding based upon prioritization of sub-packets. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706. Processor 706 can be a processor or integrated circuit dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that may store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 702 is further operatively coupled to a prioritizer 710 that assigns priorities to data packets and/or data sub-packets obtained by receiver 702 to facilitate increasing data throughput and/or resource utilization. Prioritizer 710 assigns priorities through application of a variety of schemes or rules that seek to increase the occurrences of first time successful decodes. Processor 706 is further coupled to a decoder 712 that decodes packets and/or sub-packets collected by receiver 702 and demodulated by demodulator 704. Decoder 712 decodes obtained sub-packets based upon the priorities assigned by prioritizer 710. For example, decoder 712 can decode sub-packets with higher priorities before decoding sub-packets with lower priorities. Mobile device 700 still further comprises a modulator 714 and a transmitter 716 that transmits a signal (e.g., acknowledgment message) to, for instance, a base station, another mobile device, etc. Although depicted as being separate from the processor 706, it is to be appreciated that prioritizer 710, decoder 712, and/or modulator 714 may be part of processor 706 or a number of processors (not shown).

Figure 8:
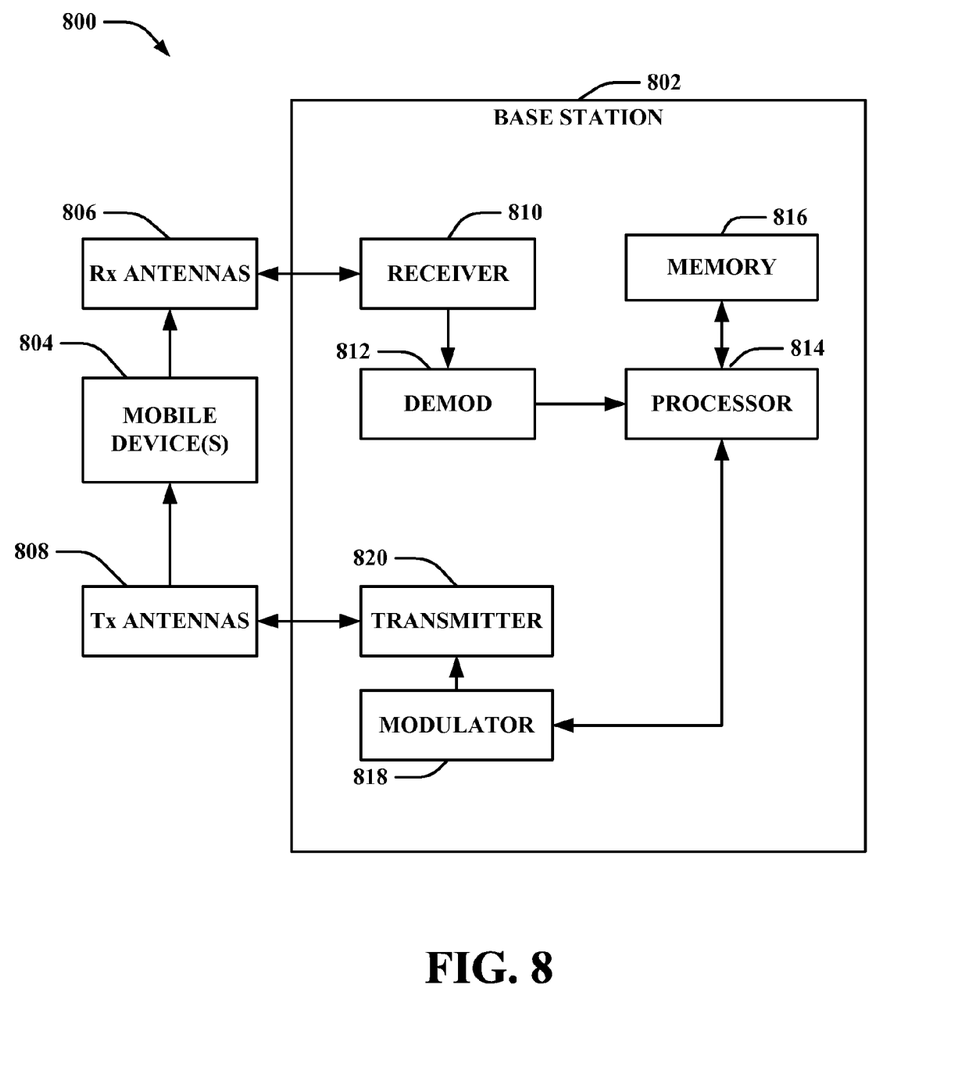
FIG. 8 is an illustration of an example system that facilitates data throughput optimization through prioritized decoding.

FIG. 8 is an illustration of a system 800 that facilitates employing a semi-connected mode. System 800 comprises a base station 802 (e.g., access point, . . . ) with a receiver 810 that receives signal(s) from one or more mobile devices 804 through a plurality of receive antennas 806, and a transmitter 820 that transmits to the one or more mobile devices 804 through a plurality of transmit antennas 808. In an aspect, transmitter 820 can transmit a data stream to the one or more mobile devices 804 as a sequence of data packets such that each packet is transmitted in turn until acknowledged. Receiver 810 can receive information from receive antennas 806 and is operatively associated with a demodulator 812 that demodulates received information. Demodulated symbols are analyzed by a processor 814 that can be similar to the processor or integrated circuit described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. For example, receiver 810 can receive an acknowledgment signal from the mobile devices 804 related to a last data packet sent by transmitter 820. Information to be transmitted may be provided to a modulator 818. Modulator 818 can multiplex the information for transmission by a transmitter 820 through antenna 808 to mobile device(s) 804. Although depicted as being separate from the processor 814, it is to be appreciated that demodulator 812 and/or modulator 818 may be part of processor 814 or a number of processors (not shown).

Figure 9:
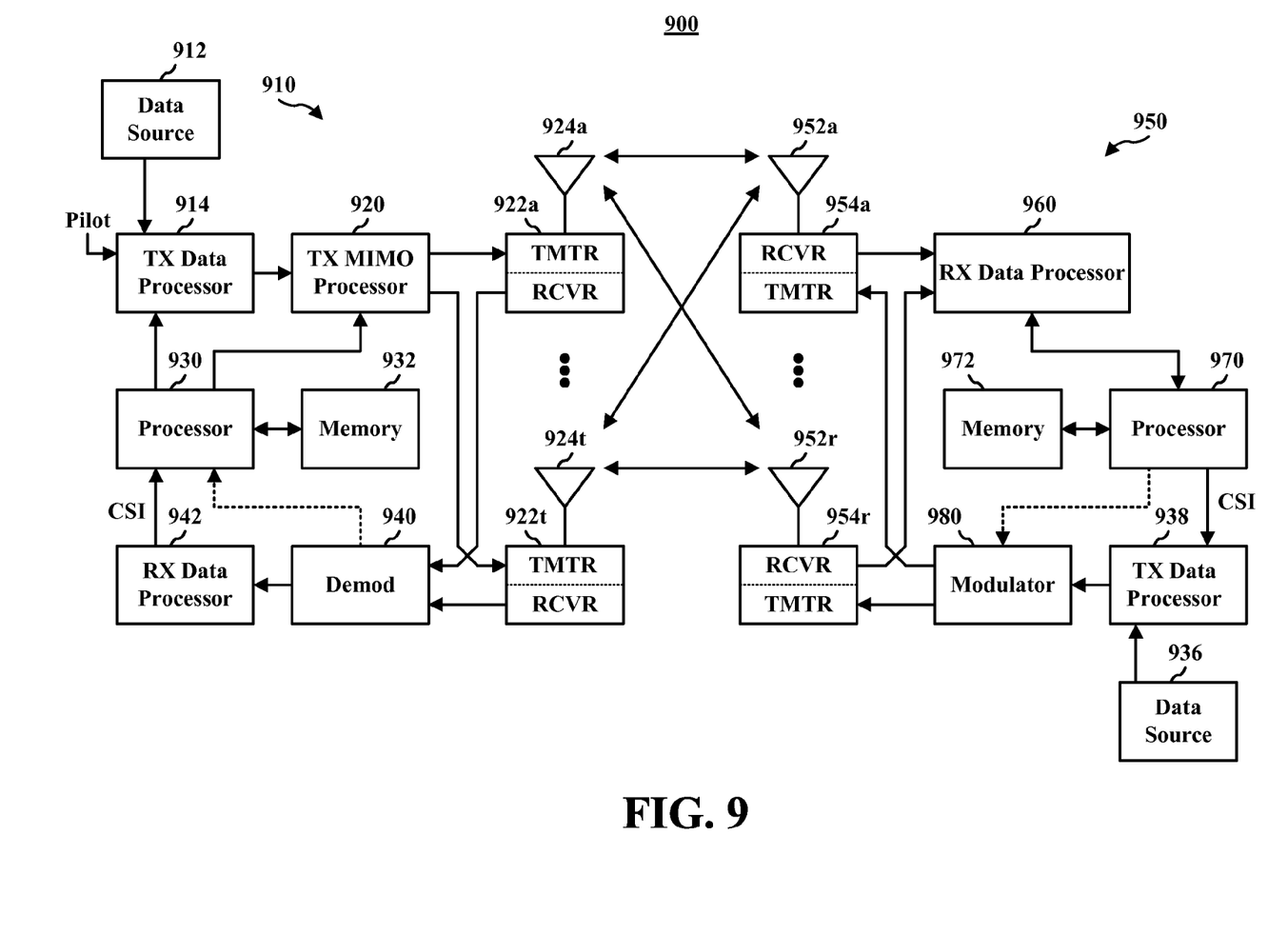
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 may include more than one base station and/or more than one mobile device, wherein additional base stations and/or mobile devices may be substantially similar or different from example base station 910 and mobile device 950 described below. In addition, it is to be appreciated that base station 910 and/or mobile device 950 may employ the systems (FIGS. 1-4 and 7-8) and/or methods (FIGS. 5 and 6) described herein to facilitate wireless communication there between.

At base station 910, traffic data for a number of data streams is provided from a data source 912 to a transmit (TX) data processor 914. According to an example, each data stream may be transmitted over a respective antenna. TX data processor 914 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 950 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 930.

The modulation symbols for the data streams may be provided to a TX MIMO processor 920, which may further process the modulation symbols (e.g., for OFDM). TX MIMO processor 920 then provides $N_T$ modulation symbol streams to $N_T$ transceivers (TMTR/RCVR) 922a through 922t. In various embodiments, TX MIMO processor 920 applies beamforming weights to the symbols of the data streams and to the antenna from which the symbol is being transmitted.

Each transceiver 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transceivers 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective transceiver (TMTR/RCVR) 954a through 954r. Each transceiver 954 conditions (e.g., filters, amplifies, and downconverts) a respective signal, digitizes the conditioned signal to provide samples, and further processes the samples to provide a corresponding "received" symbol stream.

An RX data processor 960 may receive and process the $N_R$ received symbol streams from $N_R$ transceivers 954 based on a particular transceiver processing technique to provide $N_T$ "detected" symbol streams. RX data processor 960 may demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 may periodically determine which preceding matrix to utilize as discussed above. Further, processor 970 may formulate a reverse link message comprising a matrix index portion and a rank value portion.

The reverse link message may comprise various types of information regarding the communication link and/or the received data stream. The reverse link message may be processed by a TX data processor 938, which also receives traffic data for a number of data streams from a data source 936, modulated by a modulator 980, conditioned by transceivers 954a through 954r, and transmitted back to base station 910.

At base station 910, the modulated signals from mobile device 950 are received by antennas 924, conditioned by transceivers 922, demodulated by a demodulator 940, and processed by a RX data processor 942 to extract the reverse link message transmitted by mobile device 950. Further, processor 930 may process the extracted message to determine which preceding matrix to use for determining the beamforming weights.

Processors 930 and 970 may direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
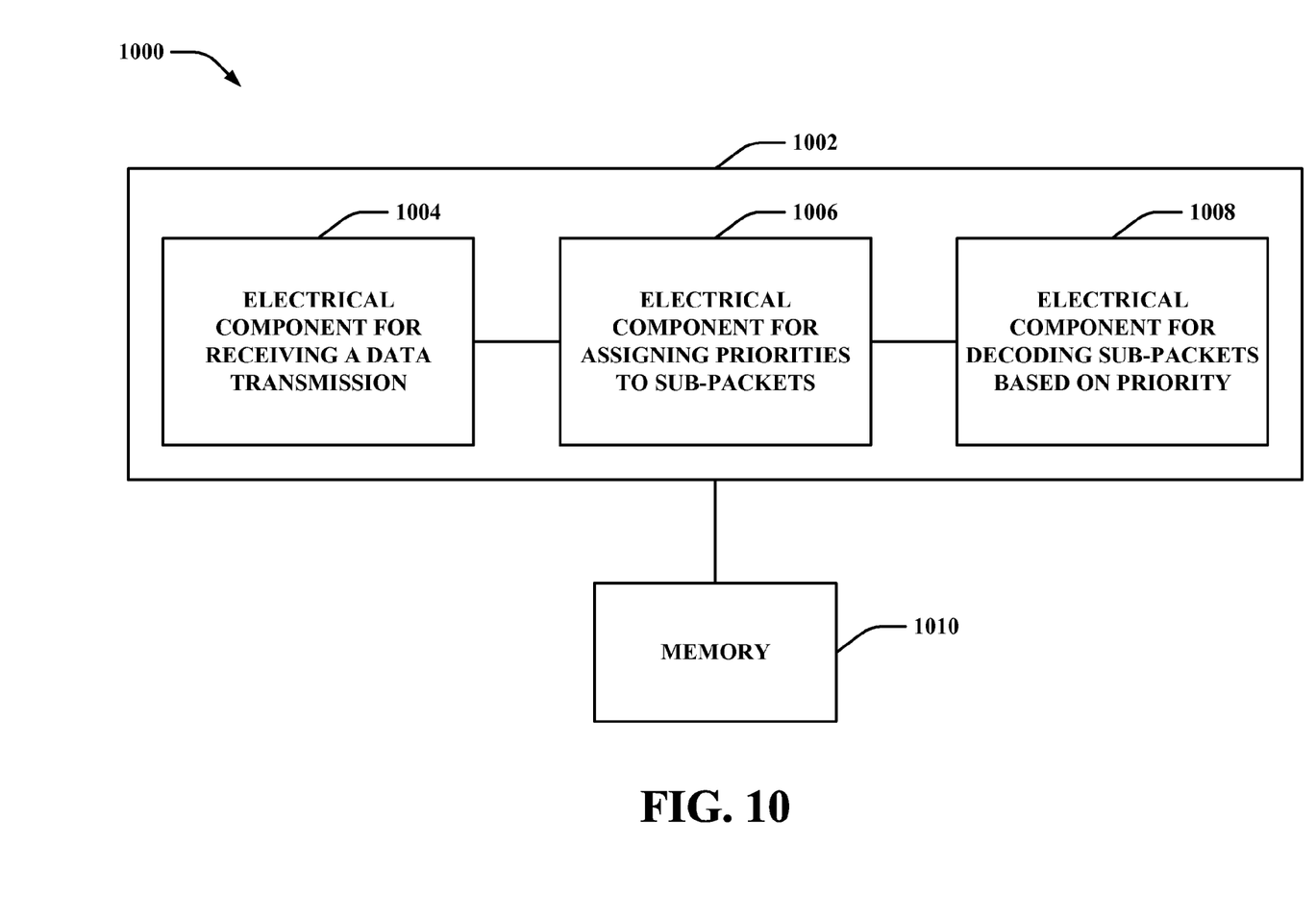
FIG. 10 is an illustration of an example system facilitates prioritized decoding.

With reference to FIG. 10, illustrated is a system 1000 that effectuates optimizing data throughput in receivers through prioritization of sub-packets for decoding. For example, system 1000 may reside at least partially within a mobile device and/or base station. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act in conjunction. For instance, logical grouping 1002 may include an electrical component for receiving a data transmission. The data transmission can include a plurality of sub-packets associated with a packet and/or transmission frame. Further, logical grouping 1002 may comprise an electrical component for assigning priorities to sub-packets. The priorities can indicate, for example, a probability of successful decoding such that higher priority sub-packets have a higher probability of successfully decoding than lower priority sub-packets. Moreover, logical grouping 1002 can include an electrical component for decoding sub-packets based upon priorities assigned. Additionally, system 1000 may include a memory 1010 that retains instructions for executing functions associated with electrical components 1004, 1006 and 1008. While shown as being external to memory 1008, it is to be understood that one or more of electrical components 1004, 1006 and 1008 may exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for decoding data, comprising:
   receiving a data transmission that includes one or more sub-packets;
   assigning a priority to each of the one or more sub-packets;
   decoding the one or more sub-packets based at least in part on the assigned priority;
   submitting the received one or more sub-packets to a sub-packet table;
   applying at least one prioritization rule to the one or more sub-packets; and
   generating an action table that specifies the one or more sub-packets and corresponding priorities.

2. The method of claim 1, further comprising providing the action table to a decoder bank to decode based at least in part on the priorities.

3. The method of claim 2, wherein the at least one prioritization rule includes assigning higher priorities to sub-packets with transmission numbers closer to a hybrid automatic repeat request threshold.

4. The method of claim 3, wherein the at least one prioritization rule includes assigning higher priorities to sub-packets with higher transmission numbers.

5. The method of claim 4, wherein the at least one prioritization rule includes assigning higher priorities to sub-packets with more receiver resources engaged.

6. The method of claim 5 wherein the at least one prioritization rule includes assigning higher priorities to sub-packets with more favorable decoder metrics.

7. The method of claim 1, further comprising providing decoding results as feedback.

8. The method of claim 7, wherein the priority is assigned based at least in part on consideration of the decoding results.

9. A wireless communication apparatus, comprising:
a memory that retains instructions related to receiving a data transmission that includes one or more sub-packets, assigning a priority to each of the one or more sub-packets and decoding the one or more sub-packets based at least in part on the assigned priority; and
an integrated circuit coupled to the memory, configured to execute the instructions retained in the memory including:
submitting the received one or more sub-packets to a sub-packet table;
applying at least one prioritization rule to the one or more sub-packets; and
generating an action table that specifies the one or more sub-packets and corresponding priorities.

10. The wireless communication apparatus of claim 9, the memory further retains instructions related to providing the action table to a decoder bank to decode based at least in part on the priorities.

11. The wireless communication apparatus of claim 10, wherein the at least one prioritization rule includes assigning higher priorities to sub-packets with transmission numbers closer to a hybrid automatic repeat request threshold.

12. The wireless communication apparatus of claim 11, wherein the at least one prioritization rule includes assigning higher priorities to sub-packets with higher transmission numbers.

13. The wireless communication apparatus of claim 12, wherein the at least one prioritization rule includes assigning higher priorities to sub-packets with more receiver resources engaged.

14. The wireless communication apparatus of claim 13, wherein the at least one prioritization rule includes assigning higher priorities to sub-packets with more favorable decoder metrics.

15. A wireless communication apparatus, comprising:
a memory that retains instructions related to receiving a data transmission that includes one or more sub-packets, assigning a priority to each of the one or more sub-packets and decoding the one or more sub-packets based at least in part on the assigned priority and wherein the priority is assigned based at least in part on consideration of quality of service levels; and
an integrated circuit coupled to the memory, configured to execute the instructions retained in the memory and wherein the memory further retains instructions related to providing decoding results as feedback.

16. The wireless communication apparatus of claim 15, wherein the priority is assigned based at least in part on consideration of the decoding results.

17. A wireless communications apparatus, that facilitates optimizing data throughput, comprising:
means for receiving a data transmission that includes one or more sub-packets;
means for assigning a priority to each of the one or more sub-packets;
means for decoding the one or more sub-packets based at least in part on the assigned priority;
means for submitting the received one or more sub-packets to a sub-packet table;
means for applying at least one prioritization rule to the one or more sub-packets; and
means for generating an action table that specifies the one or more sub-packets and corresponding priorities.

18. The wireless communications apparatus of claim 17, wherein the at least one prioritization rule includes assigning higher priorities to sub-packets with transmission numbers closer to a hybrid automatic repeat request threshold.

19. The wireless communications apparatus of claim 18, wherein the at least one prioritization rule includes assigning higher priorities to sub-packets with higher transmission numbers.

20. The wireless communications apparatus of claim 19, wherein the at least one prioritization rule includes assigning higher priorities to sub-packets with more receiver resources engaged.

21. The wireless communications apparatus of claim 20, wherein the at least one prioritization rule includes assigning higher priorities to sub-packets with more favorable decoder metrics.

22. A wireless communication apparatus, that facilitates optimizing data throughput, comprising:
means for receiving a data transmission that includes one or more sub-packets;
means for assigning a priority to each of the one or more sub-packets, wherein the priority is assigned based at least in part on consideration of quality of service levels; and
means for decoding the one or more sub-packets based at least in part on the assigned priority and further comprising means for decoding the one or more sub-packets comprises decoding a sub-packet with a highest priority first and means for providing decoding results as feedback.

23. The wireless communications apparatus of claim 22, wherein the priority is assigned based at least in part on consideration of the decoding results.

24. A non-transitory computer-readable medium comprising instructions which cause a processor to:
receive a data transmission that includes one or more sub-packets;
assign a priority to each of the one or more sub-packets;
decode the one or more sub-packets based at least in part on the assigned priority;
submit the received one or more sub-packets to a sub-packet table;
apply at least one prioritization rule to the one or more sub-packets; and
generate an action table that specifies the one or more sub-packets and corresponding priorities.

25. The non-transitory computer-readable medium of claim 24, further comprising instructions causing the processor to provide the action table to a decoder bank to decode based at least in part on the priorities.

26. The non-transitory computer-readable medium of claim 25, wherein the at least one prioritization rule includes assigning higher priorities to sub-packets with transmission numbers closer to a hybrid automatic repeat request threshold.

27. The non-transitory computer-readable medium of claim 26, wherein the at least one prioritization rule includes assigning higher priorities to sub-packets with higher transmission numbers.

28. The non-transitory computer-readable medium of claim 27, wherein the at least one prioritization rule includes assigning higher priorities to sub-packets with more receiver resources engaged.

29. The non-transitory computer-readable medium of claim 28, wherein the at least one prioritization rule includes assigning higher priorities to sub-packets with more favorable decoder metrics.

30. A non-transitory computer-readable medium comprising instructions which cause a processor to:

receive a data transmission that includes one or more sub-packets;

assign a priority to each of the one or more sub-packets and the priority is assigned based at least in part on consideration of quality of service levels; and decode the one or more sub-packets based at least in part on the assigned priority and decoding the one or more sub-packets comprises decoding a sub-packet with a highest priority first and further comprising instructions for causing the processor to provide decoding results as feedback.

31. The non-transitory computer-readable medium of claim 30, wherein the priority is assigned based at least in part on consideration of the decoding results.

* * * * *